(12) United States Patent
Lu et al.

(10) Patent No.: US 7,707,192 B1
(45) Date of Patent: Apr. 27, 2010

(54) CONFIDENCE INDEX FOR ASSETS

(75) Inventors: Samuel W. Lu, Mahwah, NJ (US); Carlos M. Tang, Robbinsville, NJ (US)

(73) Assignee: JP Morgan Chase Bank, N.A., New York, NY (US)

( * ) Notice: Subject to any disclaimer, the term of this patent is extended or adjusted under 35 U.S.C. 154(b) by 295 days.

(21) Appl. No.: 11/439,794

(22) Filed: May 23, 2006

(51) Int. Cl.
G06F 17/30 (2006.01)

(52) U.S. Cl. .................. 707/687; 707/688; 707/689; 707/690; 707/691

(58) Field of Classification Search ............ 707/10, 707/2, 3; 712/216
See application file for complete search history.

(56) References Cited

U.S. PATENT DOCUMENTS

| | | | |
|---|---|---|---|
| 3,634,669 A | 1/1972 | Soumas et al. | |
| 4,338,587 A | 7/1982 | Chiappetti | |
| 4,346,442 A | 8/1982 | Musmanno | |
| 4,355,372 A | 10/1982 | Goldberg | |
| 4,376,978 A | 3/1983 | Musmanno | |
| 4,597,046 A | 6/1986 | Musmanno et al. | |
| 4,598,367 A | 7/1986 | DeFrancesco et al. | |
| 4,642,768 A | 2/1987 | Roberts | |
| 4,674,042 A | 6/1987 | Hernandez et al. | |
| 4,674,044 A | 6/1987 | Kalmus et al. | |
| 4,736,294 A | 4/1988 | Le Grand | |
| 4,739,478 A | 4/1988 | Roberts et al. | |
| 4,760,604 A | 7/1988 | Cooper | |
| 4,774,663 A | 9/1988 | Musmanno et al. | |
| 4,831,526 A | 5/1989 | Luchs | |
| 4,859,187 A | 8/1989 | Peterson | |
| 4,859,837 A | 8/1989 | Halpern | |
| 4,866,634 A | 9/1989 | Reboh | |
| 4,897,811 A | 1/1990 | Scofield | |

(Continued)

FOREIGN PATENT DOCUMENTS

EP 0597316 5/1994

(Continued)

OTHER PUBLICATIONS

Xiaoyan Li, Time-Based Language Models, CIKM'03, Nov. 3-8, 2003, New Orleans, Louisiana, USA. Copyright 2003 ACM. pp. 469-475.*

(Continued)

*Primary Examiner*—Jean M Corrielus
*Assistant Examiner*—Thu-Nguyet Le
(74) *Attorney, Agent, or Firm*—Lowenstein Sandler PC

(57) ABSTRACT

A system and method for distributed database data and file access and retrieval, and managing assets of a company can include the steps of obtaining one or more data elements, storing each of the data elements, determining one or more factors related to a manner in which each of the data elements was obtained, associating a confidence index with each factor, and calculating a confidence index for each of the stored data elements, as well as a composite confidence index for the entire data store, based on the confidence index score for the individual data elements. The system and method can include calculating a confidence index for each of the stored data elements. The factors can include the date that the data elements were obtained. The factors can include from which of one or more sources the data elements were obtained.

20 Claims, 4 Drawing Sheets

U.S. PATENT DOCUMENTS

| | | | |
|---|---|---|---|
| 4,903,201 A | 2/1990 | Wagner | |
| 4,972,504 A | 11/1990 | Daniel, Jr. | |
| 5,041,972 A | 8/1991 | Frost | |
| 5,093,907 A | 3/1992 | Hwong et al. | |
| 5,164,904 A * | 11/1992 | Sumner | 701/117 |
| 5,220,500 A | 6/1993 | Baird | |
| 5,227,874 A | 7/1993 | Von Kohorn | |
| 5,231,571 A | 7/1993 | D'Agostino | |
| 5,245,535 A | 9/1993 | Weiss et al. | |
| 5,278,751 A | 1/1994 | Adiano | |
| 5,297,032 A | 3/1994 | Trojan et al. | |
| 5,321,933 A | 6/1994 | Seifert et al. | |
| 5,351,187 A | 9/1994 | Hassett | |
| 5,381,470 A | 1/1995 | Cambray et al. | |
| 5,396,621 A | 3/1995 | MacGregor et al. | |
| 5,444,844 A | 8/1995 | Inoue | |
| 5,481,647 A | 1/1996 | Brody | |
| 5,490,060 A | 2/1996 | Malec | |
| 5,502,805 A | 3/1996 | Anderson et al. | |
| 5,523,942 A | 6/1996 | Tyler | |
| 5,550,734 A | 8/1996 | Tater | |
| 5,551,021 A | 8/1996 | Harada | |
| 5,583,778 A | 12/1996 | Wind | |
| 5,592,590 A | 1/1997 | Jolly | |
| 5,603,025 A | 2/1997 | Tabb | |
| 5,606,496 A | 2/1997 | D'Agostino | |
| 5,611,052 A | 3/1997 | Dykstra | |
| 5,615,109 A | 3/1997 | Eder | |
| 5,615,341 A | 3/1997 | Srikant | |
| 5,623,591 A | 4/1997 | Cseri | |
| 5,644,727 A | 7/1997 | Atkins | |
| 5,649,116 A | 7/1997 | McCoy | |
| 5,655,085 A | 8/1997 | Ryan | |
| 5,657,388 A | 8/1997 | Weiss | |
| 5,657,437 A | 8/1997 | Bishop et al. | |
| 5,657,460 A | 8/1997 | Egan et al. | |
| 5,664,127 A | 9/1997 | Anderson et al. | |
| 5,671,363 A | 9/1997 | Cristofich et al. | |
| 5,675,746 A | 10/1997 | Marshall | |
| 5,689,650 A | 11/1997 | McClelland et al. | |
| 5,717,865 A | 2/1998 | Stratmann | |
| 5,721,847 A | 2/1998 | Johnson | |
| 5,727,161 A | 3/1998 | Purcell, Jr. | |
| 5,732,397 A | 3/1998 | DeTore | |
| 5,758,328 A | 5/1998 | Giovannoli | |
| 5,764,923 A | 6/1998 | Tallman et al. | |
| 5,765,144 A | 6/1998 | Larche | |
| 5,768,158 A | 6/1998 | Adler et al. | |
| 5,774,878 A | 6/1998 | Marshall | |
| 5,774,883 A | 6/1998 | Andersen et al. | |
| 5,799,286 A | 8/1998 | Morgan et al. | |
| 5,802,502 A | 9/1998 | Gell | |
| 5,812,968 A | 9/1998 | Hassan | |
| 5,819,237 A | 10/1998 | Garman | |
| 5,842,178 A | 11/1998 | Giovannoli | |
| 5,848,400 A | 12/1998 | Chang | |
| 5,852,811 A | 12/1998 | Atkins | |
| 5,870,721 A | 2/1999 | Norris | |
| 5,873,096 A | 2/1999 | Lim | |
| 5,875,437 A | 2/1999 | Atkins | |
| 5,878,258 A | 3/1999 | Pizi | |
| 5,878,403 A | 3/1999 | Agrawal | |
| 5,913,202 A | 6/1999 | Motoyama | |
| 5,918,217 A | 6/1999 | Maggioncalda | |
| 5,920,848 A | 7/1999 | Schutzer | |
| 5,930,775 A | 7/1999 | McCauley | |
| 5,940,811 A | 8/1999 | Norris | |
| 5,940,812 A | 8/1999 | Tengel et al. | |
| 5,950,175 A | 9/1999 | Austin | |
| 5,963,953 A | 10/1999 | Cram et al. | |
| 5,970,467 A | 10/1999 | Alavi | |
| 5,974,396 A | 10/1999 | Anderson | |
| 5,978,779 A | 11/1999 | Stein et al. | |
| 5,983,206 A | 11/1999 | Oppenheimer | |
| 5,987,434 A | 11/1999 | Libman | |
| 5,991,741 A | 11/1999 | Speakman et al. | |
| 5,995,942 A | 11/1999 | Smith et al. | |
| 5,999,907 A | 12/1999 | Donner | |
| 6,008,817 A | 12/1999 | Gilmore, Jr. | |
| 6,009,415 A | 12/1999 | Shurling et al. | |
| 6,018,722 A | 1/2000 | Ray et al. | |
| 6,021,397 A | 2/2000 | Jones et al. | |
| 6,026,370 A | 2/2000 | Jermyn | |
| 6,029,139 A | 2/2000 | Cunningham et al. | |
| 6,029,195 A | 2/2000 | Herz | |
| 6,032,125 A | 2/2000 | Ando | |
| 6,044,371 A | 3/2000 | Person et al. | |
| 6,055,510 A | 4/2000 | Henrick | |
| 6,055,517 A | 4/2000 | Friend et al. | |
| 6,064,985 A | 5/2000 | Anderson | |
| 6,070,147 A | 5/2000 | Harms et al. | |
| 6,073,115 A | 6/2000 | Marshall | |
| 6,076,072 A | 6/2000 | Libman | |
| 6,078,892 A | 6/2000 | Anderson et al. | |
| 6,078,901 A | 6/2000 | Ching | |
| 6,088,686 A | 7/2000 | Walker et al. | |
| 6,089,284 A | 7/2000 | Kaehler et al. | |
| 6,092,050 A | 7/2000 | Lungren et al. | |
| 6,097,391 A | 8/2000 | Wilcox | |
| 6,108,641 A | 8/2000 | Kenna et al. | |
| 6,122,623 A | 9/2000 | Garman | |
| 6,154,731 A | 11/2000 | Monks et al. | |
| 6,173,270 B1 | 1/2001 | Cristofich et al. | |
| 6,185,582 B1 | 2/2001 | Zellweger et al. | |
| 6,188,403 B1 | 2/2001 | Sacerdoti et al. | |
| 6,188,405 B1 | 2/2001 | Czerwinski et al. | |
| 6,188,993 B1 | 2/2001 | Eng et al. | |
| 6,195,092 B1 | 2/2001 | Dhond et al. | |
| 6,199,077 B1 | 3/2001 | Inala et al. | |
| 6,202,053 B1 | 3/2001 | Christiansen et al. | |
| 6,202,054 B1 | 3/2001 | Lawlor et al. | |
| 6,205,453 B1 | 3/2001 | Tucker et al. | |
| 6,212,494 B1 | 4/2001 | Boguraev | |
| 6,222,557 B1 | 4/2001 | Pulley, IV et al. | |
| 6,236,978 B1 | 5/2001 | Tuzhilin | |
| 6,243,093 B1 | 6/2001 | Czerwinski et al. | |
| 6,249,775 B1 | 6/2001 | Freeman et al. | |
| 6,256,649 B1 | 7/2001 | Mackinlay et al. | |
| 6,263,320 B1 | 7/2001 | Danilunas et al. | |
| 6,269,346 B1 | 7/2001 | Cristofich et al. | |
| 6,271,863 B1 | 8/2001 | Bose et al. | |
| 6,278,981 B1 | 8/2001 | Dembo et al. | |
| 6,282,551 B1 | 8/2001 | Anderson et al. | |
| 6,311,144 B1 | 10/2001 | Abu El Ata | |
| 6,317,726 B1 | 11/2001 | O'Shaughnessy | |
| 6,317,750 B1 | 11/2001 | Tortolani et al. | |
| 6,321,212 B1 | 11/2001 | Lange | |
| 6,330,551 B1 | 12/2001 | Burchetta et al. | |
| 6,349,290 B1 | 2/2002 | Horowitz et al. | |
| 6,349,291 B1 | 2/2002 | Varma | |
| 6,360,188 B1 | 3/2002 | Freidman et al. | |
| 6,363,393 B1 | 3/2002 | Ribitzky | |
| 6,405,204 B1 | 6/2002 | Baker et al. | |
| 6,452,613 B1 | 9/2002 | Lefebvre et al. | |
| 6,490,569 B1 | 12/2002 | Grune et al. | |
| 6,496,832 B2 | 12/2002 | Chi et al. | |
| 6,502,080 B1 | 12/2002 | Eichorst et al. | |
| 6,513,018 B1 | 1/2003 | Culhane | |
| 6,597,379 B1 | 7/2003 | Morris et al. | |
| 6,601,044 B1 | 7/2003 | Wallman | |
| 6,624,752 B2 | 9/2003 | Klitsgaard et al. | |
| 6,725,257 B1 | 4/2004 | Cansler et al. | |
| 6,738,933 B2 * | 5/2004 | Fraenkel et al. | 714/47 |
| 6,741,975 B1 | 5/2004 | Nakisa et al. | |

| | | | |
|---|---|---|---|
| 6,785,661 | B1 | 8/2004 | Mandler et al. |
| 6,850,923 | B1 | 2/2005 | Nakisa et al. |
| 6,892,052 | B2 | 5/2005 | Kotola et al. |
| 6,985,880 | B1 | 1/2006 | Hodgdon et al. |
| 6,999,943 | B1 | 2/2006 | Johnson et al. |
| 7,181,427 | B1 | 2/2007 | Defrancesco et al. |
| 7,406,442 | B1 | 7/2008 | Kottmeier, Jr. et al. |
| 7,409,364 | B1 | 8/2008 | Barton et al. |
| 2001/0011243 | A1 | 8/2001 | Dembo et al. |
| 2001/0027437 | A1 | 10/2001 | Turbeville et al. |
| 2001/0056398 | A1 | 12/2001 | Scheirer |
| 2002/0007330 | A1 | 1/2002 | Kumar et al. |
| 2002/0019791 | A1 | 2/2002 | Goss et al. |
| 2002/0019802 | A1 | 2/2002 | Malme et al. |
| 2002/0019803 | A1 | 2/2002 | Muller |
| 2002/0059139 | A1 | 5/2002 | Evans |
| 2002/0067373 | A1 | 6/2002 | Roe et al. |
| 2002/0073005 | A1 | 6/2002 | Welnicki et al. |
| 2002/0078086 | A1 | 6/2002 | Alden et al. |
| 2002/0111850 | A1 | 8/2002 | Smrcka et al. |
| 2002/0111890 | A1 | 8/2002 | Sloan et al. |
| 2002/0133383 | A1 | 9/2002 | Chao et al. |
| 2002/0147668 | A1 | 10/2002 | Smith et al. |
| 2002/0198797 | A1 | 12/2002 | Cooper et al. |
| 2003/0018492 | A1 | 1/2003 | Carlson |
| 2003/0028466 | A1 | 2/2003 | Jenson et al. |
| 2003/0061132 | A1 | 3/2003 | Yu, Sr. et al. |
| 2003/0061137 | A1 | 3/2003 | Leung et al. |
| 2003/0093351 | A1 | 5/2003 | Sarabanchong |
| 2003/0093408 | A1* | 5/2003 | Brown et al. ............ 707/2 |
| 2003/0212628 | A1 | 11/2003 | Kuttan et al. |
| 2003/0216965 | A1 | 11/2003 | Libman |
| 2003/0229582 | A1 | 12/2003 | Sherman et al. |
| 2004/0030626 | A1 | 2/2004 | Libman |
| 2004/0039588 | A1 | 2/2004 | Libman |
| 2004/0054610 | A1 | 3/2004 | Amstutz et al. |
| 2004/0054622 | A1 | 3/2004 | Strayer et al. |
| 2004/0117300 | A1 | 6/2004 | Jones et al. |
| 2004/0186773 | A1 | 9/2004 | George et al. |
| 2004/0186821 | A1* | 9/2004 | Matson et al. ............ 707/1 |
| 2004/0236641 | A1 | 11/2004 | Abbott et al. |
| 2004/0267651 | A1 | 12/2004 | Jenson et al. |
| 2005/0004855 | A1 | 1/2005 | Jenson et al. |
| 2005/0004856 | A1 | 1/2005 | Brose et al. |
| 2005/0010510 | A1 | 1/2005 | Brose et al. |
| 2005/0027632 | A1 | 2/2005 | Zeitoun et al. |
| 2005/0060252 | A1 | 3/2005 | Doddington |
| 2005/0144108 | A1 | 6/2005 | Loeper |
| 2007/0011176 | A1* | 1/2007 | Vishnubhotla ............ 707/100 |

FOREIGN PATENT DOCUMENTS

| | | |
|---|---|---|
| JP | 2002-163589 | 6/2002 |
| WO | 99/27479 | 6/1999 |
| WO | 00/02256 | 1/2000 |
| WO | 02/069212 | 9/2002 |

OTHER PUBLICATIONS

ASCH; How the RMA/Fair Isaac Credit-Scoring Model Was Built, Journal of Commercial Lending, vol. 77, No. 10, Jun. 1995, pp. 10-16.

Taylor et al.; Card Issuers Turn to Scoring as They Face Increasing Risk, Financial Services Report, vol. 8, No. 15, Jul. 24, 1991, p. 1.

Roger et al.; A Credit Scoring Model to Evaluate the Credit Worthiness of Credit Card Applicants, Developments in Marketing Science, vol. 5, 1982.

Hickman; Using Software to Soften Big-Time Competition, Bank Systems and Technology, vol. 31, No. 8, Jun. 1994, pp. 38-40.

Sullivan; Scoring Borrower Risk, Mortage Banking, vol. 55, No. 2, Nov. 1994, pp. 94-98.

Jameson; Expanding Risk Management Strategies: Key to Future Survival, Credit World, vol. 84, No. 5, May 1996, pp. 16-18.

Friedland; Credit Scoring Digs Deeper Into Data, Credit World, vol. 84, No. 5, May 1996, pp. 19-23.

Credit Scoring New Markets, Bank Technology News, vol. 9, No. 7, Jul. 1996, p. 1.

Carey; The Sub-Prime Credit Market: Identifying Good Risks for Unsecured Cards, Credit World, vol. 85, No. 1, Sep. 1996, pp. 13-15.

Opportunity Knocks at Scoring'S Door, Collection and Credit Risk, vol. 2, No. 4, Apr. 1997, p. 53.

Makuch; Managing Consumer Credit Delinquency in the US Economy: A Multi-Billion Dollar Management Science Application, Interfaces, Feb. 1992, pp. 90-109.

Portner; There Must be a Better Way, Mortgage Banking, vol. 53, No. 2, Nov. 1, 1992, pp. 12-22.

Product Data Integration Technologies, Inc., Step Integratin Authors, Printed on Apr. 26, 1999.

Freemarkets, Printed on Apr. 26, 1999.

At Your Request, www.wingspanbank.com, Sep. 28, 1999.

Meredith; Internet Bank Moves Closer to Virtual Reality, USA Today, May 5, 1995.

CSU/DSU (Channel Service Unit/Data Service Unit), CTI (Computer-Telephony Integration), pp. 208-210.

Kneis; Hedge Fund Strategies: A Primer, Canadianhedgewatch, p. 3.

Derivatives Primer, CEIBA, Association for Financial Professionals, Committee on Investment of Employee Benefit Assets, Dec. 2001.

Hedge Fund Primer—The Basics, KSP Capital Management LLC, Information@kspcapital.com, Printed Jul. 24, 2002, 18 Pages.

Armstrong; Fund of Funds: Perfect Solution or Dangerous Shortcut?, Investor Solutions, Inc., www.investorsolutions.com, Printed Jul. 24, 2002.

Hedge Fund Primer About Fund of Funds, Links Securities LLC, www.hedgefund.net/prime$_{13}$ fof.php3, 2002, 2 Pages.

Why a Fund of Funds?, Altegris Investments, www.managedinvestments.com/hedge__fund__of__funds, Printed Jul. 24, 2002.

Trading and Capital-Markets Activities Manual, Instrument Profiles: Structured Notes, Federal Reserve System, The Turin Group, www.toerien.com/books/manual/4040.htm, Printed Jul. 24, 2002, 14 Pages.

Primer: Derivatives Instruments, Derivatives Study Center, www.econstrat.org/dscinstruments.htm, Printed Jul. 24, 2002, 8 Pages.

Pourmokhtar; A Hedge Fund Primer Version 0.1, www.emf.net/?farzin/hedgefund.html, Printed Jul. 24, 2002, 5 Pages.

Huddling With William Bernstein: Small Town Doctor, Investing PRO.

Bogle; Mutual Funds at the Millennium: Fund Directors and Fund Myths, the Vanguard Group to The '40 Act Institute of PLI (Practicing Law Institute), New York, NY, May 15, 2000, 15 Pages.

Quinn; Credit Card Issuers Keeping a Closer Watch on How You Pay Bills, Washington Post, Staying Ahead, Business Section P6, Apr. 25, 1988, 1 Page.

Spirer; When Bad Credit Behavior Becomes the Norm, Credit World, vol. 85, Iss. 6, Jul./Aug. 1997, p. 18.

Markese; Can You Trust Mutual Fund Rankings?, Consumers' Research Magazine, vol. 76, No. 10, Research Library, Oct. 1993, p. 20.

McLaughlin; Tapping Web to Search for Right Fund—Fundprofiler Speeds Search, Boston Herald, Boston, MA, Dec. 16, 1999, p. 70.

Cumby et al.; Evaluating the Performance of International Mutual Funds, The Journal of Finance, vol. 45, No. 2, Jun. 1990, pp. 497-521.

Gottfried et al.; Graphical Definitions: Making Spreadsheets Visual Through Direct Manipulation and Gestures, Visual Languages, 1997, Proceedings, 1997 IEEE Symposium on, Sep. 23-26, 1997, pp. 246-253, Abstract.

GS-CALC 6.0.1.1.; JPS Development; http://download.com, Printed Sep. 3, 2003.

Buchner et al.; Hotdoc: A Flexible Framework for Spatial Composition, Visual Languages, 1997, Proceedings, 1997 IEEE Sympsium, Abstract, Sep. 23-26, 1997, pp. 92-99.

Snyder et al.; Identifying Design Requirements Using Analysis Structures, Aerospace and Electronics Conference, 1991, NAECON, 1991, vol. 2, Abstract, May 20-24, 1991, pp. 786-792.

Davenport et al.; Numbers-A Medium That Counts [Spreadsheet Software]; Computer Graphics and Applications; IEEE; vol. 11; Issue 4; Abstract, Jul. 1991, pp. 39-44.

Stolte et al.; Polaris: A System for Query, Analysis, and Visualization of Multidimensional Relational Databases; Visualization and Computer Graphics; IEEE Transactions on; vol. 8; Issue 1; Abstract, Jan./Mar. 2002, pp. 52-65.

Chi et al.; Principles for Information Visualization Spreadsheets; Computer Graphics and Applications; IEEE; vol. 18; Issue 4; Abstract, Jul./Aug. 1998, pp. 92-99.

Spreadsheet Mapper; www.panopticon.com., Printed Oct. 1, 2003.

TCS 4.20; Telsys SAS; http://download.com, Printed Sep. 30, 2003.

Spoerri; Visual Tools for Information Retrieval; Visual Languages; 1993; Proceedings; 1993 IEEE Symposium on; pp. 160-168; Abstract.

Internet; Lending Tree, Mortgage Apply Online in Minutes, www.lendingtree.com, 7 Pages, Printed Feb. 1, 1999.

Storms, Phillip; Using Mortgage Credit to Achieve Client Objectives, Journal of Financial Planning, ISSN/ISBN: 10403981, Proquest Document ID: 10403981, vol. 9, Issue 5, 9 Pages, Oct. 1996.

Storms, Phillip; Using Mortgage Credit to Achieve Client Objectives, Journal of Financial Planning, ISSN/ISBN: 10403981; Proquest Document ID:10403981; Denver: vol. 9; Issue 5; 9 Pages, Oct. 1996.

Anonymous, "Am Ex-Costco Co-Brand: Is it a Marketing or Merchant Acceptance Strategy?" proquest.umi.com, Card News, Potomac, vol. 14, Issue 16, p. 1 (Aug. 25, 1999).

Anonymous, "Two Chips Can Be Better Than One," proquest.umi.com, Card Technology, New York, p. 40 (May 2001).

cardweb.com, "Kmart MasterCard (Sep. 26, 2000),".

Hinds, Michael, "Making the Most of Fast Falling Mortgage Rates," New York Times, Late City Final Ed, col. 2, p. 1 (Jun. 30, 1985).

Jazzy Jeff, "Credit Card Commentaries," cardoffers.com, The Credit Card Directory, Posted Commentaries: Kmart MasterCard (2003).

\* cited by examiner

CONFIDENCE INDEX FOR ASSETS

FIELD OF THE INVENTION

The present invention relates generally to distributed database data and file access and retrieval, and, more particularly, to methods and systems for managing company data and assets.

BACKGROUND OF THE INVENTION

In today's business world, large companies must store and keep track of millions of pieces of information and data, using systems for distributed database data and file access and retrieval. The pieces of data, typically stored in databases, include information related to personnel, payroll, taxes, finances, real estate holdings, computer and communications equipment, office equipment, business plans and public documents, as well as other categories of information.

A company receives pieces of data at different times. For example, some pieces of data may have been obtained recently, within the last few months, while other pieces of data may have been obtained several years ago. In addition, different pieces of data are received in different manners. For example, one piece of data can be obtained from a human source, while another piece of data can be obtained from an in-house database, while still another piece of data may be obtained from a third-party entity's database.

Because different pieces of data are obtained at different times, and from different sources, some pieces of data are more likely to be accurate than others. For example, in general, pieces of data obtained more recently will tend to have a higher likelihood of being accurate than pieces of data obtained a relatively longer time ago. This is because, in a dynamic environment, circumstances upon which the piece of data is based can change, and are more likely to change as more time elapses. Similarly, pieces of data obtained from one source can have a higher likelihood of being accurate than pieces of data obtained from another source. For example, a piece of data obtained from a local database that is automatically updated may have a higher likelihood of being accurate than a piece of data obtained from a remotely-located human source.

A typical large company stores, references, and relies upon millions of pieces of data, each with a different probability or likelihood of being accurate. It is difficult, however, for a company to understand, when relying on data, which pieces of data are more likely to be accurate, and which pieces of data are less likely to be accurate, and by how much.

Because many important business decisions rely upon an analysis of many pieces of data, the lack of knowledge regarding the accuracy of different pieces of data can affect the accuracy of strategic and business decisions.

For example, if a company is approached, during licensing negotiations, by a software vender that alleges that the company's employees in several countries have a total of 170,000 copies of a certain desktop software application, and the company believes that the actual number is only 120,000, the company is at a disadvantage if it cannot determine the accuracy of its data related to the number of copies of software. In addition, companies tend to spend large amounts of time and resources validating data which is already accurate.

Accordingly, there are certain deficiencies with the manner in which companies store and reference data. Therefore, a need exists for improved systems and methods for managing company assets and data.

SUMMARY OF THE INVENTION

Embodiments of the present invention satisfy these and other needs by providing a system and method for distributed database data and file access and retrieval, and for managing company assets and data.

A system and method of managing assets of a company can include the steps of obtaining one or more data elements, storing each of the data elements, determining one or more factors related to a manner in which each of the data elements was obtained, associating a confidence index with each factor, and calculating a confidence index for each of the stored data elements. The system and method can include calculating a confidence index for each of the stored data elements. The factors can include the date that the data elements were obtained. The factors can include from which of one or more sources the data elements were obtained.

BRIEF DESCRIPTION OF THE DRAWINGS

The invention can be understood from the detailed description of exemplary embodiments presented below, considered in conjunction with the attached drawings, of which.

It is to be understood that the attached drawings are for purposes of illustrating the concepts of the invention and may not be to scale.

DETAILED DESCRIPTION OF THE INVENTION

Embodiments of the invention assign a confidence index value to obtained data elements to provide a company with a clear understanding of which information is more reliable, and which is less reliable.

An embodiment of the invention is directed to a system and method for managing information. The embodiment provides for a system and method for providing a confidence score for individual pieces of data. In general, because a company obtains different pieces of data in different ways, certain pieces of data can be more reliable (or have a higher probability of being correct) than other pieces of data. An embodiment of the invention is directed to associating a confidence level with each piece of data, based on how each piece of data (data element) is obtained. Factors that can be considered in determining the confidence level of a piece of data include the date that the piece of data was obtained, and the source of the piece of data.

An embodiment of the invention is directed to associating a confidence level with each piece of data, based on how each piece of data is obtained. Factors that can be considered in determining the confidence level of a piece of data include the date that the piece of data was obtained, and the source of the piece of data.

Figure 1:
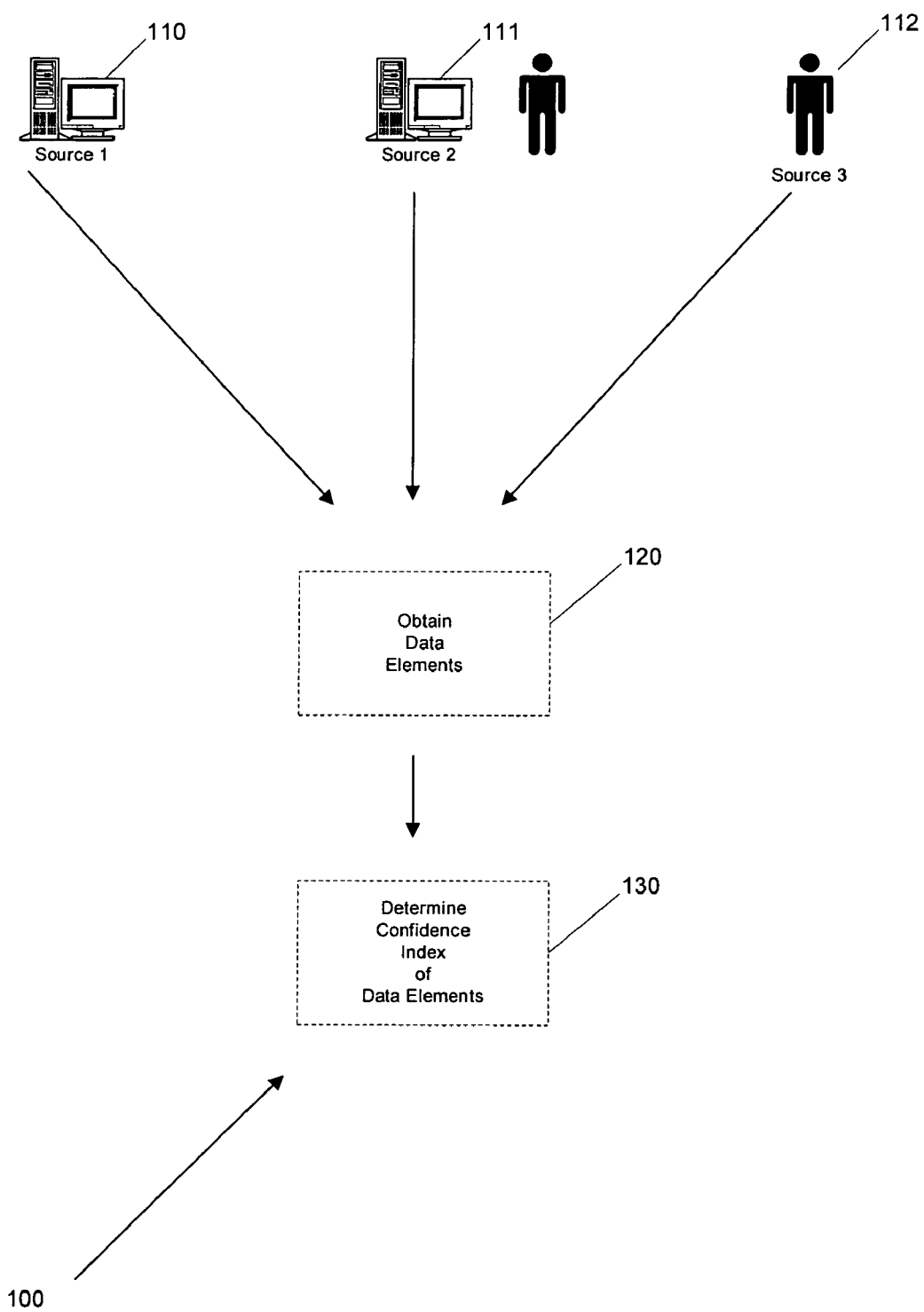
FIG. 1 is a schematic of a system in accordance with embodiments of the invention.

With reference to FIG. 1, there is shown a system 100 configured in accordance with embodiments of the invention. By way of the system 100, data elements, such as for example, data related to computer, server, network and information technology systems, can be obtained from various sources 110, 111, 112. The sources can include a combination of fully automated data collection sources 110, automated data collection sources having partial manual input and intervention operations 111 and substantially manual data collection sources 112. The data elements can be obtained from the various sources and stored at 120. Next, a confidence index can be determined for each of the data elements, at 130.

Figure 2:
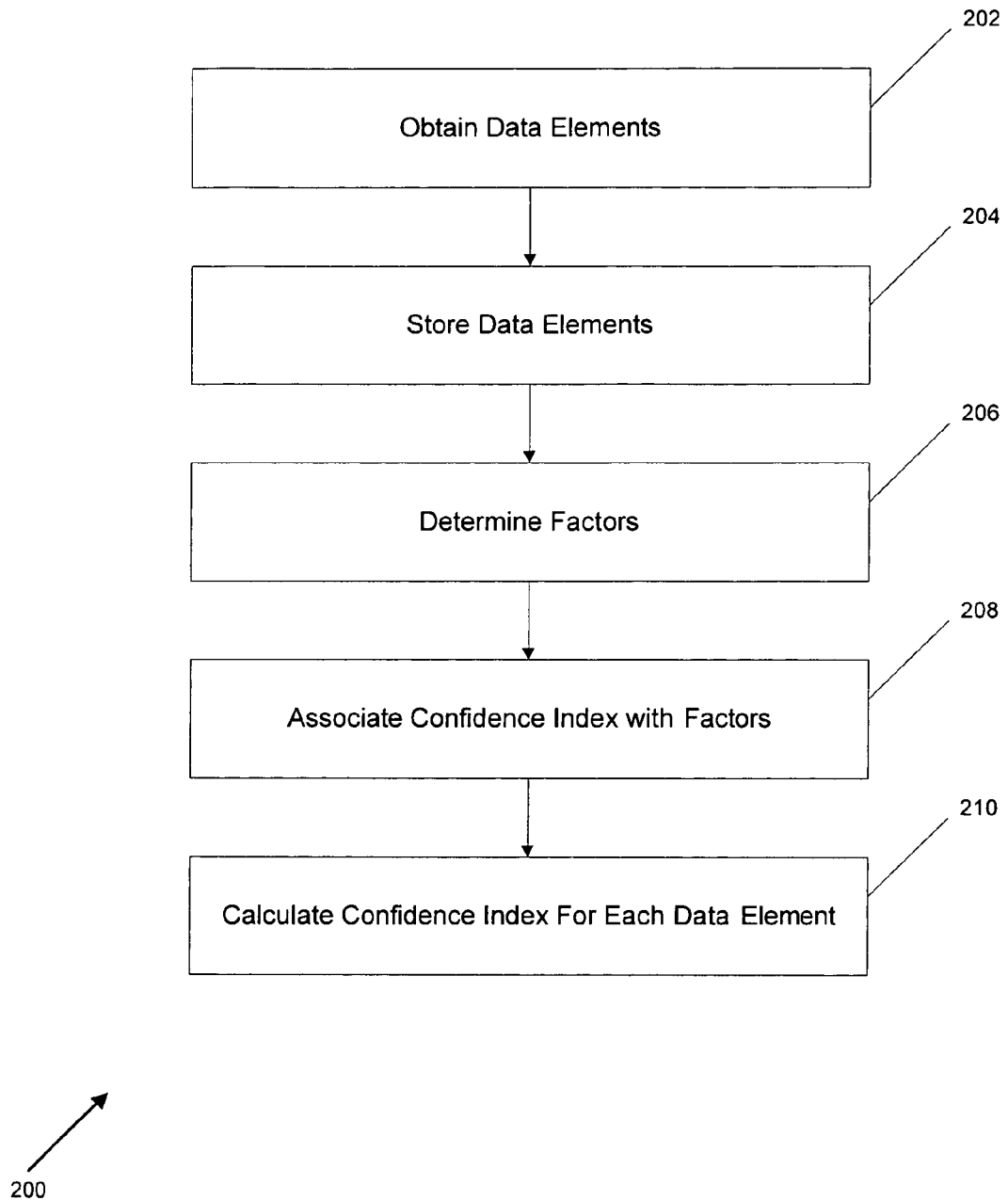
FIG. 2 is a flow diagram illustrating a method in accordance with embodiments of the invention.

With reference to FIG. 2, there is shown a method 200 for managing data elements in accordance with embodiments of the invention. First, the data elements are obtained from various sources. Step 202. Next, the obtained data elements are stored. Step 204. Next, in step 206, a determination is made of factors related to the obtained data elements for use in calculating a confidence index for each data element. Step 206. The factors employed can include the date (i.e., how recently) the data element was obtained. In general, data elements obtained more recently are typically considered to have a higher level of confidence than data elements obtained longer ago. The factors employed can also include the source from which the data element was obtained. For example, some sources, such as those that are provided via human input, and thus that are subject to human error, can be considered relatively less reliable, and thus have a relatively lower confidence index. In contrast, some sources, such as those supplied by fully automated data gathering systems, can be considered relatively more reliable, and thus have a relatively higher associated confidence index. Accordingly, next, a confidence index is associated with each factor. Step 208. Finally, based on the confidence index of each of the factors related to each of the data elements, a confidence index is calculated for each data element. Step 210

Figure 3:
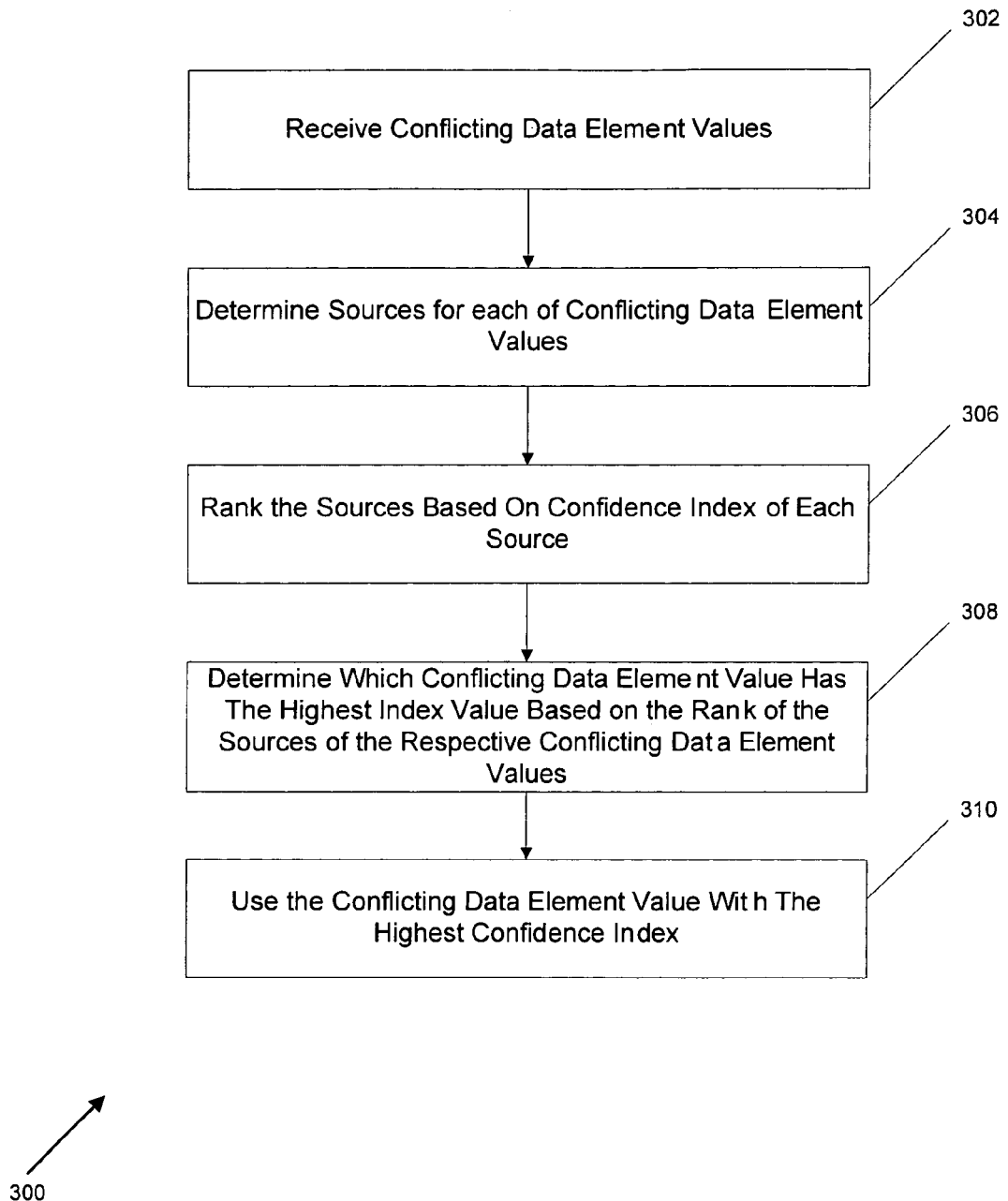
FIG. 3 is a flow diagram illustrating a method in accordance with embodiments of the invention.

With reference to FIG. 3, there is shown a method 300 in accordance with embodiments of the invention. By way of the method, data element values for the same data element can be received from multiple sources. Step 302. Such a situation is common as business enterprises typically have overlapping pieces of data stored at multiple locations, or sources. As is also typical, the data values from different sources can be different, or conflicting. Next, in step 304, the source of each of the conflicting data element values is determined. Next, the ranks (confidence levels) of the various data sources are determined, and each of the conflicting data element values is ranked based upon the ranking of each data element value's associated source ranking. Step 308. Finally, the data element value with the highest confidence index value is used and assumed to be accurate. Step 310.

Figure 4:
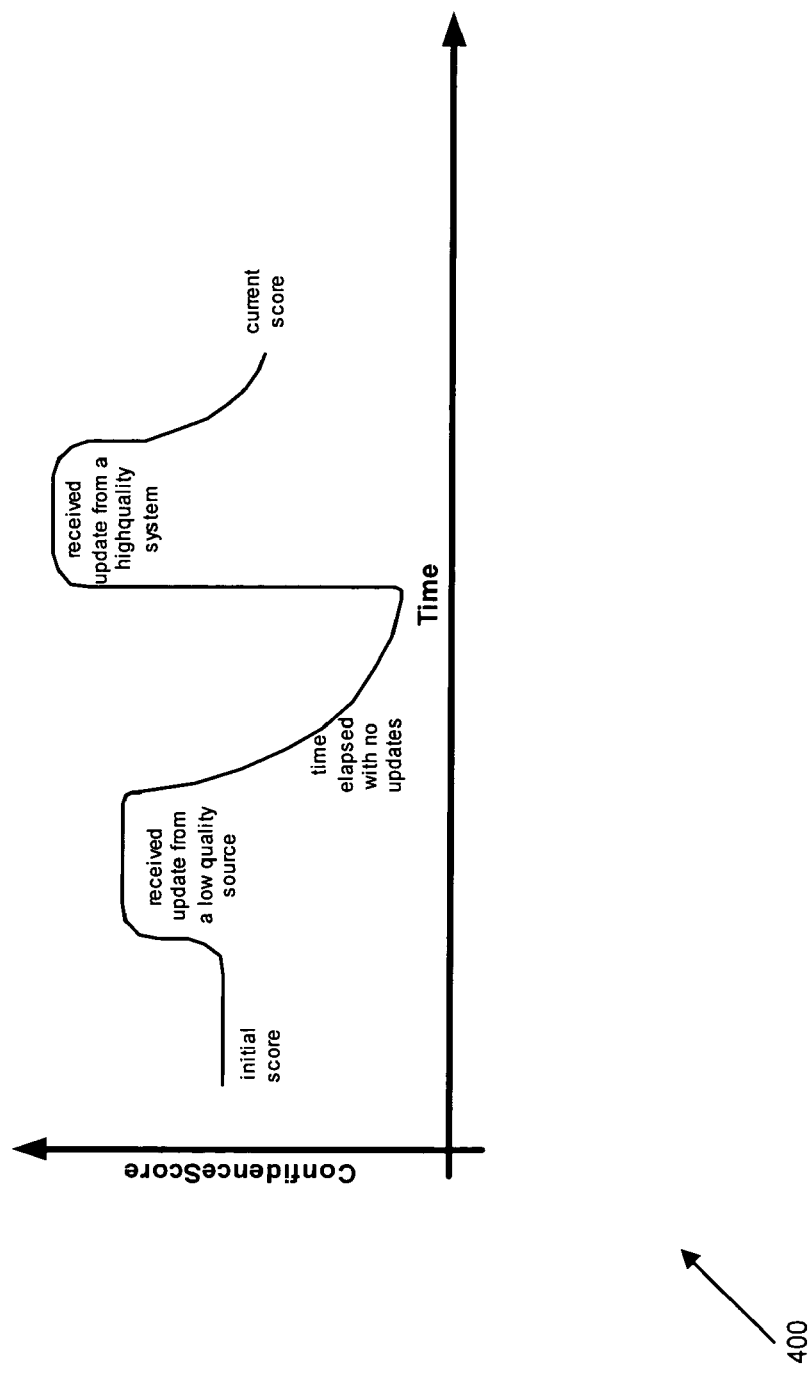
FIG. 4 is a graphical representation of the changing of confidence scores of data elements over time, in accordance with embodiments of the invention.

As the confidence index of any particular data element will tend to be dynamic over time, with reference to FIG. 4, there is shown a graphical representation 400 of the confidence index (score) of a typical data element as the confidence index changes with time. First, a data element value is received with an initial confidence index score, based upon various related factors, such as, for example, the confidence index of the source from which the data element value was received. Next, the confidence index of the data element value increase as an updated value is received, albeit from a source having a relatively low confidence index. Next, as time elapses without a subsequent update of data element value, the confidence index of the data element value gradually decreases. Next, an update of the data element value is received from a source having a relatively high confidence index, thus causing the confidence index of the data element value to increase. Finally, as time elapses without a subsequent data element value update, the confidence index of the data element value again gradually decreases.

By way of embodiments of the invention, different sources of information can be ranked from most-trusted to least-trusted. Similarly, a ranking can be associated with a piece of data based on when the piece of data was received. A weighted average formula can then be used to provide an overall confidence rating for each piece of data.

Each piece of data (data element) can have several confidence parameters, or index vectors, which are weighted and combined to arrive at an aggregate confidence value. Confidence levels for a piece of data can be calculated and stored periodically. Upon review of a history of stored data and confidence levels, a confidence level can be calculated by looking at a trend of calculated values, or, alternatively, by assigning the highest weight to the most recent value obtained. In addition, sets of data with missing pieces of data may receive a low cumulative confidence level, due to the missing data pieces.

As described above with respect to FIG. 4, in situations where conflicting data is received from two different sources, embodiments of the invention allow the company to compare the confidence levels of each of the conflicting pieces of data to determine which piece of data to use. Embodiments of the invention also can help a company determine which pieces of data or groups or types of data have relatively low confidence levels, so that the company can target and focus efforts and resources for improving data confidence levels on the low-confidence data types.

Embodiments of the invention can provide insight into the basis for a particular confidence index score for a data element. For example, if a certain data element has a relatively low confidence index score, a user can have the ability to drill down and determine why the confidence index score for that element is low. Thus, if for example, the confidence index score for a data element is low because values for the data element have not been updated or refreshed for a relatively long time period, the user can determine that reason. Armed with such knowledge, the user could better determine how to improve the confidence index score for that data element (e.g., by refreshing the read value more frequently) is such an improvement is desired.

Embodiments of the invention can also provide insight into the cost of acquiring information related to a particular data element. Thus, it could be determined by a user that the cost of acquiring information related to a particular data element on a yearly basis could have a cost of "x" dollars, and yield a confidence index score of "A." It could then be determined that raising that, for example, refreshing the information related to the data element on a monthly basis would raise the confidence index to "2×A," but at an additional cost of "y" dollars. Armed with such knowledge, the user can make an informed choice, based on the relative importance of the data element, of whether incurring the cost of raising the confidence index score of a particular data element to a certain value is worth it to a company or enterprise.

An embodiment of the invention is directed to an aggregate document tool that can determine an overall confidence level for a complete set of data on a particular document. Thus, by way of the embodiment, an aggregate or composite confidence level can be determined for an entire data store. Alternatively, an aggregate confidence level for a portion of a data store can be calculated. The aggregate confidence levels can be calculated based on the confidence index levels of individual data elements. All or a portion of the data elements can be used.

Embodiments of the invention can be directed to any type of inventory system, such as computer hardware inventory. Other embodiments can be directed to financial data, such as a "10K" form, the data on which comes from a variety of sources within the company.

An exemplary embodiment could be used to maintain an inventory related to, for example, 40,000 servers within a company. A company could use the system to monitor information about the location of the servers, as well as how accurate that information is. Information (data elements) that can be monitored and managed can include aggregate data from the 40,000 servers, such as server attributes, includes, where the server is located (what building), the server model, serial number, name of corresponding support team, software applications that run on the servers, and/or financial systems (cost centers) to bill back to.

As for the location of the server, such information could be explicitly supplied, or, alternatively, could be partially derived based on certain network characteristics of the server, as complemented with information about the physical location of the network.

Information (data elements) can be provided by having a software agent, that resides on a network, scan computers and other hardware coupled to the network. Alternatively, the information (data elements) can be manually entered into a spreadsheet or other similar form by a support team or an application team (i.e., software developers).

Other exemplary information (data elements) that can be obtained includes an analysis of network traffic via network port scans, a serials number or bios from a computer, and whom the computer or workstation is assigned to.

In alternative embodiments, the invention can be used to provide a confidence index for information related to telecommunications equipment, and/or credit rating information for customers.

Thus, embodiments of an invention have been described wherein a system and method of the invention are directed to associating a confidence level with each piece of data, based on how each piece of data is obtained. Factors that can be considered in determining the confidence level of a piece of data include the date that the piece of data was obtained, and the source of the piece of data. By way of embodiments of the invention, a company or other user can beneficially manage information by understanding the degree to which different portions of the information can be relied upon.

It is to be understood that the exemplary embodiments are merely illustrative of the invention and that many variations of the above-described embodiments can be devised by one skilled in the art without departing from the scope of the invention. It is therefore intended that all such variations be included within the scope of the following claims and their equivalents.

What is claimed is:

1. A computer-implemented method of associating a data element value with a data element, the method comprising the steps of:
   utilizing a computer to obtain a plurality of data element values from one or more data sources, wherein each of the plurality of data element values are related to a single data element;
   storing the plurality of data element values;
   determining at least one factor related to each of the plurality of data element values;
   calculating a present confidence index for each of the plurality of data element values based on the at least one factor, comprising:
      periodically calculating one or more confidence indexes for each of the plurality of data element values,
      storing the periodically calculated confidence indexes, and
      utilizing a historic trend of the periodically calculated confidence indexes for each data element value as the at least one factor when calculating the present confidence index;
   comparing the present confidence index for each of the plurality of data element values to determine a data element value with the highest present confidence index;
   selecting the data element value with the highest present confidence index; and
   associating the selected data element value with the data element.

2. The computer-implemented method of claim 1, wherein the at least one factor includes a date that each of the plurality of data element values were obtained.

3. The computer-implemented method of claim 1, wherein the at least one factor includes from which of the one or more sources each of the plurality of data elements were obtained.

4. The computer-implemented method of claim 2, wherein calculating the present confidence index includes calculating a weighted average wherein data element values obtained on a more recent date receive a greater weight than data element values obtained less recently.

5. The computer-implemented method of claim 3, wherein calculating the present confidence index includes calculating a weighted average wherein the one or more data sources are ranked based on reliability, and data element values obtained from a source having a higher ranking receive a greater weight than data element values obtained from a source having a lower ranking.

6. The computer-implemented method of claim 1, comprising:
   identifying a group of data element values that have a relatively low present confidence index; and
   focusing resources on improving the present confidence index of the group.

7. The computer-implemented method of claim 1, wherein the data elements include server attributes.

8. The computer-implemented method of claim 7, wherein server attributes include one or more of a server location, a server number, a server support team, and software programs that are resident on the server.

9. The computer-implemented method of claim 1, comprising:
   calculating an aggregate confidence index based on the present confidence indexes of a plurality of data element values.

10. The computer-implemented method of claim 1, comprising:
    displaying the method by which the present confidence index is calculated for one of the data element values.

11. The computer-implemented method of claim 1, comprising:
    displaying a cost related to the calculating of a present confidence index for one of the data element values.

12. A system for associating a data element value with a data element, the system comprising:
    a storage device; and
    one or more processors designed and configured for:
       obtaining a plurality of data element values from one or more data sources, wherein each of the plurality of data element values are related to the same data element;
       storing the plurality of data element values;
       determining at least one factor related to each of the plurality of data element values;

calculating a present confidence index for each of the plurality of data element values based on the at least one factor, comprising:
  periodically calculating one or more confidence indexes for each of the plurality of data element values,
  storing the periodically calculated confidence indexes, and
  utilizing a historic trend of periodically calculated confidence indexes as the at least one factor when calculating the present confidence index;
comparing the present confidence index for each of the plurality of data element values to determine the data element value with the highest present confidence index;
selecting the data element value with the highest present confidence; and
associating the selected data element value with the data element.

13. The system of claim 12, wherein the at least one factor includes a date that each of the data element values were obtained.

14. The system of claim 12, wherein the at least one factor includes from which of the one or more sources each of the plurality of data elements were obtained.

15. The system of claim 13, wherein calculating the present confidence index includes calculating a weighted average wherein data element values obtained on a more recent date receive a greater weight than data element values obtained less recently.

16. The system of claim 14, wherein calculating the present confidence index includes calculating a weighted average wherein the sources are ranked based on reliability, and data element values obtained from a source having a higher ranking receive a greater weight than data element values obtained from a source having a lower ranking.

17. The system of claim 12, wherein the one or more processors are configured for:
  identifying a group of data element values that have a relatively low present confidence index; and
  focusing resources on improving the present confidence index of the group.

18. The system of claim 12, wherein the data elements include server attributes.

19. The system of claim 18, wherein the server attributes include one or more of a server location, a server serial number, a server support team, and software programs that are resident on the server.

20. A method of associating a data element value with a data element, the method comprising the steps of:
  obtaining the plurality of data element values from a plurality of data sources;
  storing the plurality of data element values;
  determining at least one factor related to each of the plurality of data element values;
  calculating a present confidence index for each of the plurality of data element values based on the present confidence index associated with each factor, wherein calculating the present confidence index includes calculating a weighted average wherein data element values obtained on a more recent data receive a greater weight than data element values obtained less recently, and wherein calculating the present confidence index includes calculating a weighted average wherein the plurality of data sources are ranked based on reliability, and data element values obtained from a data source having a higher ranking receive a greater weight than data element values obtained from a data source having a lower ranking, and
  periodically calculating one or more confidence indexes for each of the plurality of data element values;
  storing the periodically calculated confidence indexes; and utilizing a historic trend of periodically calculated confidence indexes used as the at least one factor when calculating the present confidence index;
  comparing the present confidence index for each of the plurality of data element values to determine a data element values with the highest present confidence index;
  selecting the data element value with the highest present confidence value; and
  associating the selected data element value with the data element.

* * * * *